(12) United States Patent
Zhang et al.

(10) Patent No.: US 11,101,645 B2
(45) Date of Patent: Aug. 24, 2021

(54) ELECTROMAGNETIC INDUCTION TYPE WIRELESS POWER SUPPLY SYSTEM AND LOAD SUDDEN-CHANGE PROTECTION CIRCUIT THEREOF

(71) Applicant: Foshan Shunde Midea Electrical Heating Appliances Manufacturing Co., Ltd., Foshan (CN)

(72) Inventors: Fan Zhang, Foshan (CN); Yunfeng Wang, Foshan (CN); Lutian Zeng, Foshan (CN); Wenhua Liu, Foshan (CN); Shufeng Huang, Foshan (CN); Jun Lei, Foshan (CN); Deyong Jiang, Foshan (CN)

(73) Assignee: FOSHAN SHUNDE MIDEA ELECTRICAL HEATING APPLIANCES MANUFACTURING CO., LTD., Foshan (CN)

( * ) Notice: Subject to any disclaimer, the term of this patent is extended or adjusted under 35 U.S.C. 154(b) by 0 days.

(21) Appl. No.: 16/855,943

(22) Filed: Apr. 22, 2020

(65) Prior Publication Data
US 2020/0251896 A1 Aug. 6, 2020

Related U.S. Application Data

(63) Continuation of application No. PCT/CN2017/111148, filed on Nov. 15, 2017.

(30) Foreign Application Priority Data

Oct. 24, 2017 (CN) .......................... 201721384652.5

(51) Int. Cl.
*H02H 3/20* (2006.01)
*H02H 3/24* (2006.01)
(Continued)

(52) U.S. Cl.
CPC ............... *H02H 9/04* (2013.01); *H02J 50/12* (2016.02); *H02J 50/80* (2016.02); *H02M 1/32* (2013.01)

(58) Field of Classification Search
None
See application file for complete search history.

(56) References Cited

U.S. PATENT DOCUMENTS 8,482,290 B2 * 7/2013 Steckley ............ G01R 19/2513
324/522
10,116,136 B2 * 10/2018 McCullough ............. H02J 3/14
(Continued)

FOREIGN PATENT DOCUMENTS

CN 102723694 A 10/2012
CN 104037883 A 9/2014
(Continued)

OTHER PUBLICATIONS

Foshan Shunde Midea Electrical Heating Appliances Manufacturing Co., Limited, Extended European Search Report, EP17929604.1, dated Aug. 11, 2020, 9 pgs.
(Continued)

*Primary Examiner* — Kenneth B Wells
(74) *Attorney, Agent, or Firm* — Morgan, Lewis & Bockius LLP (57) ABSTRACT

A power supply system includes a wireless power supply end and a wireless receiving end. The wireless receiving end includes a resonant receiving component and a rectifying and voltage-stabilizing component that is connected to the resonant receiving component to output a voltage-stabilized power supply (VCC). A load sudden-change protection circuit includes an overvoltage protection component and an under-voltage protection component that are each respectively connected to the voltage-stabilized power supply and a load. The overvoltage protection component turns on the
(Continued)

load when the voltage of the voltage-stabilized power supply is higher than a first preset voltage due to sudden turn-off of the load. The under-voltage protection component turns off the load when the voltage of the voltage-stabilized power supply is lower than a second preset voltage due to sudden turn-on of the load.

14 Claims, 3 Drawing Sheets

(51) Int. Cl.
    *H02H 3/247*     (2006.01)
    *G06F 1/28*     (2006.01)
    *G06F 1/30*     (2006.01)
    *H02H 9/04*     (2006.01)
    *H02J 50/80*     (2016.01)
    *H02J 50/12*     (2016.01)
    *H02M 1/32*     (2007.01)

(56) References Cited

U.S. PATENT DOCUMENTS

| | | |
|---|---|---|
| 2014/0333142 A1 | 11/2014 | Desrosiers |
| 2016/0181815 A1 | 6/2016 | Black et al. |
| 2016/0315472 A1* | 10/2016 | McCullough ............ H02J 3/00 |
| 2017/0117708 A1* | 4/2017 | Wang ...................... H02J 3/00 |
| 2017/0133884 A1 | 5/2017 | Walley et al. |

FOREIGN PATENT DOCUMENTS

| | | |
|---|---|---|
| CN | 104052161 A | 9/2014 |
| CN | 105934863 A | 9/2016 |
| CN | 206498183 U | 9/2017 |
| EP | 3107187 A1 | 12/2016 |
| JP | S 5911713 A | 1/1984 |

OTHER PUBLICATIONS

Foshan Shunde Midea Electrical Heating Appliances Manufacturing Co., Limited, Communication Pursuant to Rules 70(2) and 70a(2), EP17929604.1, dated Aug. 28, 2020, 1 pg.

International Search Report, PCT/CN2017/111148, dated Jul. 25, 2018, 10 pgs.

* cited by examiner

ELECTROMAGNETIC INDUCTION TYPE WIRELESS POWER SUPPLY SYSTEM AND LOAD SUDDEN-CHANGE PROTECTION CIRCUIT THEREOF

CROSS REFERENCE TO RELATED APPLICATIONS

This application is a continuation of PCT Application No. PCT/CN2017/111148, filed Nov. 15, 2017, entitled "ELECTROMAGNETIC INDUCTION TYPE WIRELESS POWER SUPPLY SYSTEM AND LOAD SUDDEN-CHANGE PROTECTION CIRCUIT THEREOF", which claims priority to Chinese Patent Application No. 201721384652.5, filed Oct. 24, 2017, entitled "ELECTROMAGNETIC INDUCTION TYPE WIRELESS POWER SUPPLY SYSTEM AND LOAD SUDDEN-CHANGE PROTECTION CIRCUIT THEREFOR", both of which are incorporated herein by reference.

FIELD OF THE INVENTION

The present invention relates to the technical field of household appliances and in particular to a load sudden-change protection circuit for an electromagnetic induction type wireless power supply system, an electromagnetic induction type wireless power supply system and a separated cooking appliance with the electromagnetic induction type wireless power supply system.

Due to the advantage of wireless connection, the wireless power supply technology prevents the structural design from being limited by wire connection, and therefore will be applied more and more in the future. For example, if the wireless power supply technology is applied to a separated heating platform, the wireless power supply for a carrier part may be realized.

However, power adjustment feedback of wireless power supply is based on wireless power supply communication, the power feedback is a relatively slow due to relatively long communication period, so that it takes a long time for a power transmitting end to adjust an output voltage to a set value when a load is changed, resulting in obvious fluctuation of the output voltage and even resulting in system failure. For example, when the load is suddenly increased, the output voltage may be reduced to result in power failure of a wireless power supply receiving end so that system operation interruption may be caused, and when the load is suddenly decreased, the output voltage may suddenly rise, which results in a sudden rise of a voltage and even results in an overvoltage to burn a chip.

SUMMARY OF THE INVENTION

The present invention aims to at least solve one of the technical problems in the above-mentioned technology to some extent.

Therefore, the first objective of the present invention is to provide a load sudden-change protection circuit for an electromagnetic induction type wireless power supply system, which may effectively solve problems of device damage in the circuit, system operation interruption and the like caused by a sudden change of a load.

The second objective of the present invention is to provide an electromagnetic induction type wireless power supply system.

The third objective of the present invention is to provide a separated cooking appliance.

In order to achieve the above-mentioned objectives, the first aspect of the present invention provides a load sudden-change protection circuit for an electromagnetic induction type wireless power supply system. The electromagnetic induction type wireless power supply system includes a wireless power supply end and a wireless receiving end. The wireless receiving end includes a resonant receiving unit and a rectifying and voltage-stabilizing unit connected to the resonant receiving unit. The rectifying and voltage-stabilizing unit processes electric energy received by the resonant receiving unit to output a voltage-stabilized power supply. The load sudden-change protection circuit includes: an overvoltage protection unit, the overvoltage protection unit being separately connected to the voltage-stabilized power supply and a load, and the overvoltage protection unit turning on the load when the voltage of the voltage-stabilized power supply is higher than a first preset voltage due to sudden turn-off of the load; and an under-voltage protection unit, the under-voltage protection unit being separately connected to the voltage-stabilized power supply and the load, and the under-voltage protection unit turning off the load when the voltage of the voltage-stabilized power supply is lower than a second preset voltage due to sudden turn-on of the load.

According to the load sudden-change protection circuit for the electromagnetic induction type wireless power supply system provided by the present invention, the overvoltage protection unit turns on the load when the voltage of the voltage-stabilized power supply is higher than the first preset voltage due to sudden turn-off of the load, and the under-voltage protection unit turns off the load when the voltage of the voltage-stabilized power supply is lower than the second preset voltage due to sudden turn-on of the load. Therefore, the problems of device damage in the circuit, system operation interruption and the like caused by the sudden change of the load may be effectively solved.

In addition, the load sudden-change protection circuit for the electromagnetic induction type wireless power supply system, provided as above by the present invention, may further have the following additional technical features:

In detail, the overvoltage protection unit includes: a first voltage-stabilizing tube, the cathode of the first voltage-stabilizing tube being separately connected to positive electrode ends of the voltage-stabilized power supply and the load; a first resistor, one end of the first resistor being connected to the anode of the first voltage-stabilizing tube; and a first triode, a base electrode of the first triode being connected to the other end of the first resistor, an emitting electrode of the first triode being grounded, and a collector electrode of the first triode being connected to a negative electrode end of the load.

In detail, the under-voltage protection unit includes: a second voltage-stabilizing tube, the cathode of the second voltage-stabilizing tube being separately connected to the positive electrode ends of the voltage-stabilized power supply and the load; a second resistor, one end of the second resistor being connected to the anode of the second voltage-stabilizing tube; a second triode, a base electrode of the second triode being connected to the other end of the second resistor, and an emitting electrode of the second triode being grounded; and a third triode, an emitting electrode of the third triode being connected to a collector electrode of the second triode, a collector electrode of the third triode being connected to a negative electrode end of the load, and a base electrode of the third triode being connected to a main control chip of the wireless receiving end through a third resistor, wherein the third triode is turned on or off under the control of the main control chip of the wireless receiving end.

In detail, the resonant receiving unit includes: a wireless receiving coil, the wireless receiving coil being matched with a wireless transmitting coil of the wireless power supply end, and the wireless receiving coil being electromagnetically coupled with the wireless transmitting coil so as to ensure that electric energy is transmitted between the wireless power supply end and the wireless receiving end; and a first resonant capacitor and a second resonant capacitor, one end of the first resonant capacitor being connected to one end of the wireless receiving coil, the other end of the first resonant capacitor being connected to one end of the second resonant capacitor and being provided with a first node, and the other end of the second resonant capacitor being connected to the other end of the wireless receiving coil and being provided with a second node.

In detail, the rectifying and voltage-stabilizing unit includes a rectifier bridge and a voltage-stabilizing circuit, a first input end of the rectifier bridge is connected to the first node, a second input end of the rectifier bridge is connected to the second node, a first output end of the rectifier bridge is connected to the voltage-stabilizing circuit, and a second output end of the rectifier bridge is grounded.

Further, the voltage-stabilizing circuit includes: a first electrolytic capacitor, a positive electrode end of the first electrolytic capacitor being connected to the first output end of the rectifier bridge, and a negative electrode end of the first electrolytic capacitor being grounded; a fourth resistor, one end of the fourth resistor being connected to a positive electrode end of the first electrolytic capacitor and being provided with a third node, wherein the voltage-stabilizing circuit outputs the voltage-stabilized power supply through the third node; a fifth resistor, one end of the fifth resistor being connected to the other end of the fourth resistor, and the other end of the fifth resistor being grounded; and a first capacitor, the first capacitor being connected in parallel to the fifth resistor.

Further, the wireless receiving end includes a communication demodulation circuit and a communication modulation circuit, the communication demodulation circuit is connected between the main control chip and the other end of the wireless receiving coil, the communication modulation circuit is connected between the main control chip and one end of the wireless receiving coil, the main control chip receives communication information transmitted by the wireless power supply end through the wireless receiving coil and the communication demodulation circuit and transmits the communication information to the wireless power supply end through the communication modulation circuit and the wireless receiving coil.

In order to achieve the above-mentioned objective, the second aspect of the present invention provides an electromagnetic induction type wireless power supply system including the load sudden-change protection circuit for the electromagnetic induction type wireless power supply system provided in the first aspect of the present invention.

According to the electromagnetic induction type wireless power supply system provided by the present invention, the problems of device damage in the circuit, system operation interruption and the like caused by the sudden change of the load may be effectively solved through the above-mentioned load sudden-change protection circuit for the electromagnetic induction type wireless power supply system.

In order to achieve the above-mentioned objective, the third aspect of the present invention provides a separated cooking appliance including the electromagnetic induction type wireless power supply system provided in the second aspect of the present invention.

In detail, the wireless power supply end is arranged in a cooker body of the separated cooking appliance, and the wireless receiving end is arranged in a cooker cover of the separated cooking appliance.

Further, the separated cooking appliance is a separated electric rice cooker or separated electric pressure cooker.

According to the separated cooking appliance, the problems of device damage in the circuit, system operation interruption and the like caused by the sudden change of the load may be effectively solved through the above-mentioned electromagnetic induction type wireless power supply system.

Advantages of the additional aspects of the present invention will be partially given in the following description, and part of the advantages will become clear through the following description or will be understood through the practice of the present invention.

DETAILED DESCRIPTION OF THE EMBODIMENTS

In the following, embodiments of the present invention are described in detail, examples of the embodiments are shown in the accompanying drawings, wherein the same or similar numeral symbols always denote the same or similar element or elements with the same or similar functions. The embodiments described below with reference to the accompanying drawings are exemplary and are intended to explain the present invention, but should not be understood as a limitation to the present invention.

The load sudden-change protection circuit for an electromagnetic induction type wireless power supply system, the electromagnetic induction type wireless power supply system and the separated cooking appliance with the electromagnetic induction type wireless power supply system in embodiments of the present invention are described below with reference to the accompanying drawings.

In the embodiments of the present invention, the separated cooking appliance may be internally provided with the electromagnetic induction type wireless power supply system of the present invention, wherein the separated cooking appliance may be a separated electric rice cooker or separated electric pressure cooker.

Figure 1:
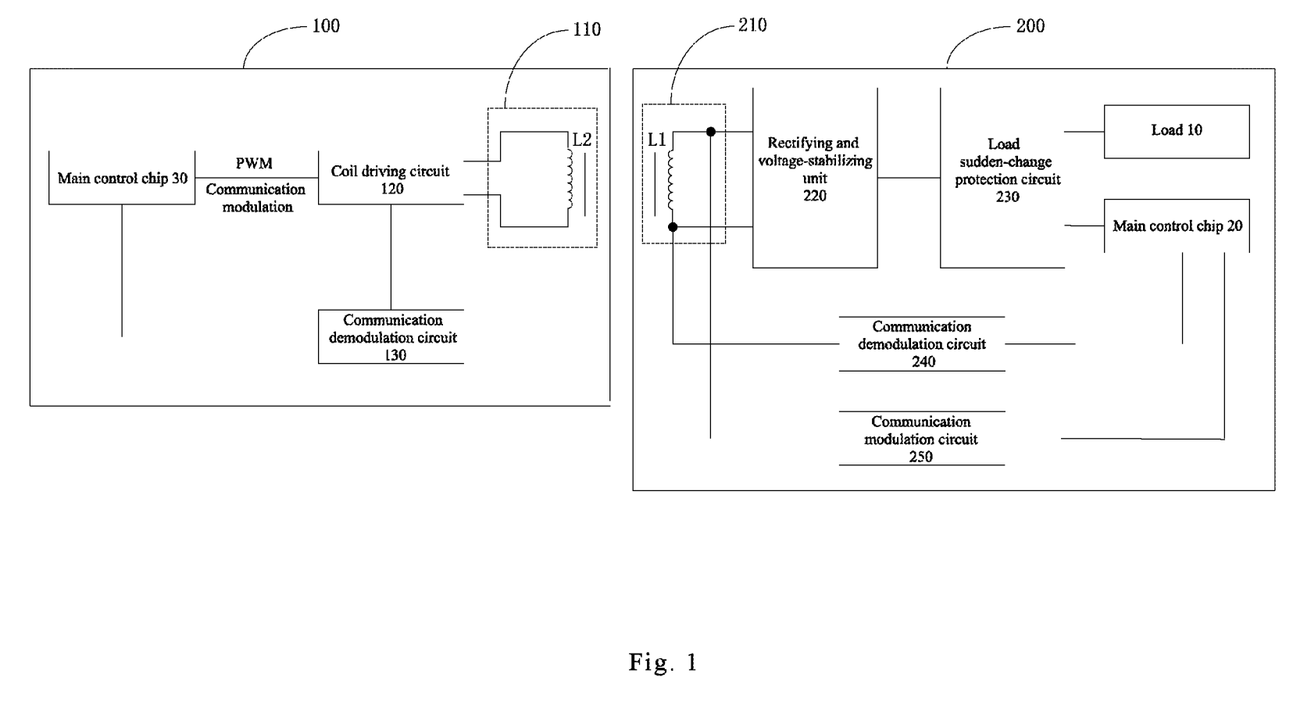
FIG. 1 is a schematic diagram of an electromagnetic induction type wireless power supply system according to an embodiment of the present invention.

As shown in FIG. 1, the electromagnetic induction type wireless power supply system in the embodiment of the present invention may include a wireless power supply end 100 and a wireless receiving end 200, the wireless receiving end 200 may include a resonant receiving unit 210, a rectifying and voltage-stabilizing unit 220 connected to the resonant receiving unit 210 and a load sudden-change protection circuit 230 connected to the rectifying and voltage-stabilizing unit 220, wherein the rectifying and voltage-stabilizing unit 220 may process electric energy received by the resonant receiving unit 210 to output a voltage-stabilized power supply.

In one embodiment of the present invention, as shown in FIG. 1, the wireless receiving end 200 may further include a communication demodulation circuit 240 and a communication modulation circuit 250, the communication demodulation circuit 240 is connected between a main control chip 20 and the other end of a wireless receiving coil L1, the communication modulation circuit 250 is connected between the main control chip 20 and one end of the wireless receiving coil L1, the main control chip 20 receives communication information transmitted by the wireless power supply end 100 through the wireless receiving coil L1 and the communication demodulation circuit 240 and transmits the communication information to the wireless power supply end 100 through the communication modulation circuit 250 and the wireless receiving coil L1.

In the embodiment of the present invention, the wireless power supply end 100 may include a resonant transmitting unit 110, a coil driving circuit 120, a main control chip 30 and a communication demodulation circuit 130, wherein the resonant transmitting unit 110 is connected to the coil driving circuit 120, the coil driving circuit 120 is connected to the main control chip 30, and the communication demodulation circuit 130 is separately connected to the main control chip 30 and the coil driving circuit 120.

For example, assuming that a cooker body of the separated cooking appliance is provided with the wireless power supply end 100 of the electromagnetic induction type wireless power supply system of the present invention, a cooker cover is provided with the wireless receiving end 200 of the electromagnetic induction type wireless power supply system of the present invention.

After the cooker body of the cooking appliance is electrified by a user, the main control chip 30 of the wireless power supply end 100 in the cooker body may control the coil driving circuit 120 to start to work so as to drive the resonant transmitting unit 110 arranged on the cooker body to generate an alternating electromagnetic field. When the resonant receiving unit 210 arranged on the cooker cover senses the alternating electromagnetic field, an induced voltage signal may be generated according to the alternating electromagnetic field, and then, the rectifying and voltage-stabilizing unit 220 in the cooker cover processes the induced voltage signal to output a stabilized power supply so as to supply power to a load 10 (a pressure detection sensor, a temperature detection sensor, a humidity detection sensor and the like) in the cooker cover.

During wireless power supply from the cooker body to the cooker cover through electromagnetic induction, the main control chip 20 of the wireless receiving end 200 in the cooker cover may transmit a detected voltage value of the wireless receiving end 200 (for example, the voltage value may be the voltage value of the above-mentioned stabilized power supply) to the wireless power supply end 100 through the communication modulation circuit 250 and the wireless receiving coil L1. Then, the main control chip 30 of the wireless power supply end 100 receives the voltage value transmitted by the wireless receiving end 200 through a wireless transmitting coil L2 and the communication demodulation circuit 130, and the voltage of the wireless receiving end 200 is adjusted by adjusting the transmitting power, so that the stability of wireless power supply may be guaranteed.

It should be noted that the communication interval during wireless power supply described in the above-mentioned embodiment is relatively long and is generally longer than 20 ms, and therefore, the power adjustment is relatively slow; and when the load 10 is changed, it is likely to result in fluctuation of an output voltage (namely the voltage of the stabilized power supply output by the rectifying and voltage-stabilizing unit 220), if the voltage is not limited, an overvoltage may appear to damage devices when the voltage is high, and a receiving system (namely the wireless receiving end 200) may reset to stop working when the voltage is low.

Figure 2:
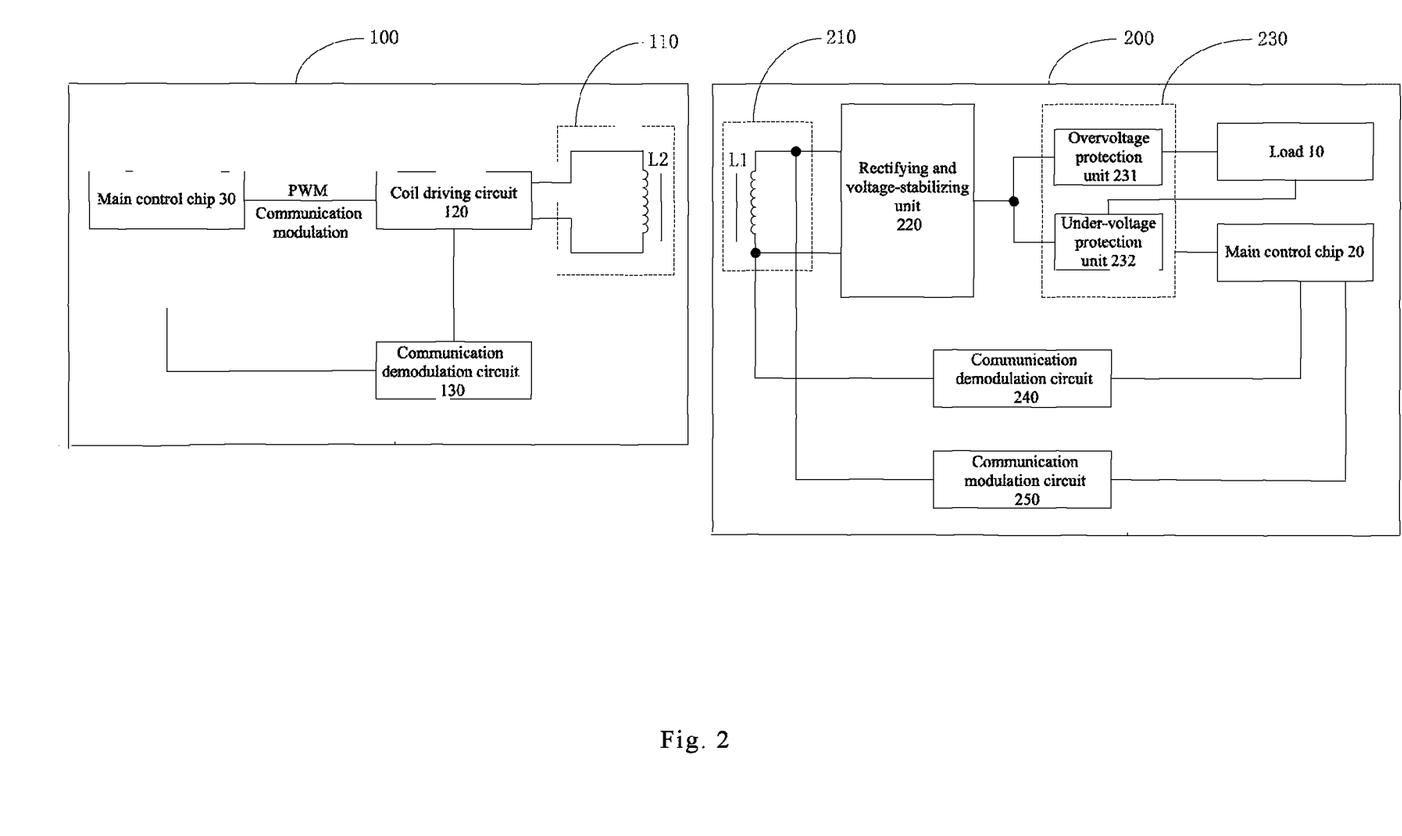
FIG. 2 is a schematic diagram of an electromagnetic induction type wireless power supply system with a load sudden-change protection circuit according to an embodiment of the present invention.

Further, FIG. 2 is a schematic diagram of an electromagnetic induction type wireless power supply system with a load sudden-change protection circuit according to an embodiment of the present invention.

As shown in FIG. 2, the load sudden-change protection circuit for the electromagnetic induction type wireless power supply system in the embodiment of the present invention may include an overvoltage protection unit 231 and an under-voltage protection unit 232.

The overvoltage protection unit 231 is separately connected to the voltage-stabilized power supply and the load 10, and the overvoltage protection unit 231 turns on the load 10 when the voltage of the voltage-stabilized power supply is higher than a first preset voltage due to sudden turn-off of the load 10. The under-voltage protection unit 232 is separately connected to the voltage-stabilized power supply and the load 10, and the under-voltage protection unit 232 turns off the load 10 when the voltage of the voltage-stabilized power supply is lower than a second preset voltage due to sudden turn-on of the load 10. The first preset voltage and the second preset voltage may be set according to actual conditions.

For example, when the load 10 is suddenly turned off, the voltage of the voltage-stabilized power supply output by the rectifying and voltage-stabilizing unit 220 may instantly rise due to excessive power instantly provided by the wireless power supply end 100, if the voltage of the voltage-stabilized power supply is higher than the first preset voltage, the main control chip 20 may turn on the load 10 by controlling the overvoltage protection unit 231, so that the voltage of the voltage-stabilized power supply is not higher than the first preset voltage, and furthermore, device damage in the circuit due to the sudden change of the load is avoided.

When the load 10 is suddenly turned on, the voltage of the voltage-stabilized power supply output by the rectifying and voltage-stabilizing unit 220 may drop due to insufficient power provided by the wireless power supply end 100, if the voltage of the voltage-stabilized power supply is lower than the second preset voltage, the main control chip 20 may turn off the load 10 by controlling the under-voltage protection unit 232, so that the voltage of the voltage-stabilized power supply is not lower than the second preset voltage, and furthermore, the problem that the operation of the wireless receiving end 200 is interrupted due to the sudden change of the load is avoided.

Circuit structures of the overvoltage protection unit 231 and the under-voltage protection unit 232 are described in detail below with reference to the accompanying drawings.

Figure 3:
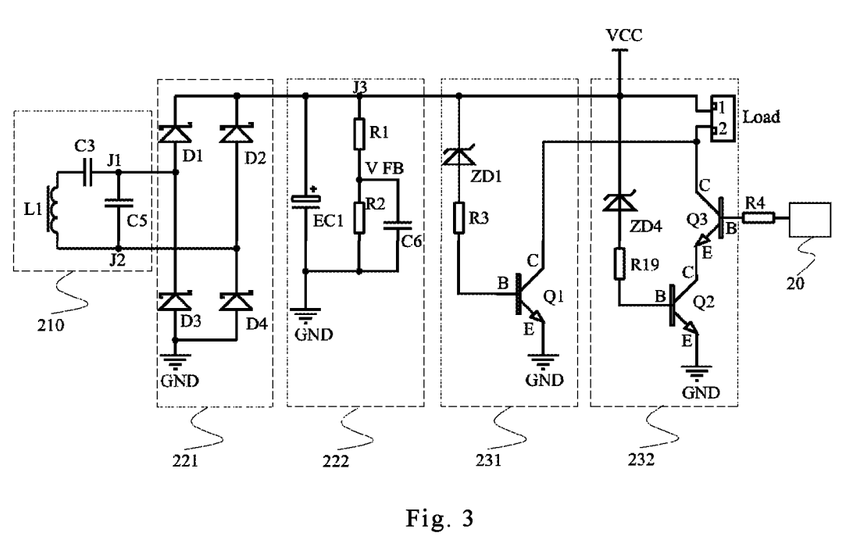
FIG. 3 is a schematic circuit diagram of a wireless receiving end of an electromagnetic induction type wireless power supply system according to one embodiment of the present invention.

In one embodiment of the present invention, as shown in FIG. 3, the overvoltage protection unit 231 may include a first voltage-stabilizing zener diode ZD1, a first resistor R3 and a first BJT Q1, wherein the cathode of the first voltage-stabilizing tube ZD1 is separately connected to positive electrode ends of the voltage-stabilized power supply Voltage Common Collector (VCC) and the load 10, one end of the first resistor R3 is connected to the anode of the first voltage-stabilizing zener diode ZD1, a base electrode B of the first BJT Q1 is connected to the other end of the first resistor R3, an emitting electrode E of the first BJT Q1 is grounded, and a collector electrode C of the first BJT Q1 is connected to a negative electrode end of the load 10.

In another embodiment of the present invention, as shown in FIG. 3, the under-voltage protection unit 232 may include a second voltage-stabilizing zener diode ZD4, a second resistor R19, a second BJT Q2, a third BJT Q3, wherein the cathode of the second voltage-stabilizing zener diode ZD4 is separately connected to the positive electrode ends of the voltage-stabilized power supply VCC and the load 10; one end of the second resistor R19 is connected to the anode of the second voltage-stabilizing zener diode ZD4; a base electrode B of the second BJT Q2 is connected to the other end of the second resistor R19, and an emitting electrode E of the second BJT Q2 is grounded; and an emitting electrode E of the third BJT Q3 is connected to a collector electrode C of the second BJT Q2, a collector electrode C of the third BJT Q3 is connected to a negative electrode end of the load 10, and a base electrode B of the third BJT Q3 is connected to a main control chip 20 of the wireless receiving end 200 through a third resistor R4, wherein the third BJT Q3 is turned on or off under the control of the main control chip 20 of the wireless receiving end 200.

In detail, as shown in FIG. 3, the load 10 is controlled by the third BJT Q3, when the load 10 is suddenly turned off, the voltage of the voltage-stabilized power supply VCC output by the rectifying and voltage-stabilizing unit 220 may instantly rise due to excessive power instantly provided by the wireless power supply end 100, if the voltage of the voltage-stabilized power supply VCC is higher than a rated voltage (namely the first preset voltage) of the first voltage-stabilizing zener diode ZD1 at the moment, the main control chip 20 may control the first BJT Q1 to be turned on, so that the load 10 is turned on again to reduce the voltage of the voltage-stabilized power supply VCC, and furthermore, the aim of limiting the voltage of the voltage-stabilized power supply VCC is achieved, namely the voltage of the voltage-stabilized power supply VCC is not higher than the rated voltage of the first voltage-stabilizing zener diode ZD1.

When the load 10 is suddenly turned on, the voltage of the voltage-stabilized power supply VCC output by the rectifying and voltage-stabilizing unit 220 may drop due to insufficient power provided by the wireless power supply end 100, if the voltage of the voltage-stabilized power supply VCC is lower than a rated voltage (namely the second preset voltage) of the second voltage-stabilizing zener diode ZD4 at the moment, the main control chip 20 may control the second BJT Q2 to be turned off, so that the load 10 is turned off, and furthermore, the aim of limiting the voltage of the voltage-stabilized power supply VCC is achieved, namely the voltage of the voltage-stabilized power supply VCC is not lower than the rated voltage of the second voltage-stabilizing zener diode ZD4.

Based on the above, the voltage-stabilized power supply VCC described in the embodiment may be obtained in a way that the rectifying and voltage-stabilizing unit 220 processes electric energy received by the resonant receiving unit 210.

Specific circuit structures of the resonant receiving unit 210 and the rectifying and voltage-stabilizing unit 220 are described in detail below with reference to the accompanying drawings.

In one embodiment of the present invention, as shown in FIG. 2 and FIG. 3, the resonant receiving unit 210 may include a wireless receiving coil L1, a first resonant capacitor C3 and a second resonant capacitor C5, wherein the wireless receiving coil L1 is matched with the wireless transmitting coil L2 of the wireless power supply end 100, and the wireless receiving coil L1 is electromagnetically coupled with the wireless transmitting coil L2 so as to ensure that electric energy is transmitted between the wireless power supply end 100 and the wireless receiving end 200. One end of the first resonant capacitor C3 is connected to one end of the wireless receiving coil L1, the other end of the first resonant capacitor C3 is connected to one end of the second resonant capacitor C5 and is provided with a first node J1, and the other end of the second resonant capacitor C5 is connected to the other end of the wireless receiving coil L1 and is provided with a second node J2.

In another embodiment of the present invention, as shown in FIG. 3, the rectifying and voltage-stabilizing unit 220 may include a rectifier bridge 221 and a voltage-stabilizing circuit 222, wherein a first input end of the rectifier bridge 221 is connected to the first node J1, a second input end of the rectifier bridge 221 is connected to the second node J2, a first output end of the rectifier bridge 221 is connected to the voltage-stabilizing circuit 222, and a second output end of the rectifier bridge 221 is grounded.

Further, as shown in FIG. 3, the rectifier bridge 221 may include a first diode D1, a second diode D2, a third diode D3 and a fourth diode D4, wherein the cathode of the first diode D1 is connected to a third node J3, the anode of the first diode D1 is separately connected to the cathode of the third diode D3 and the first node J1, the anode of the third diode D3 is grounded, the cathode of the second diode D2 is connected to the third node J3, the anode of the second diode D2 is separately connected to the cathode of the fourth diode D4 and the second node J2, and the anode of the fourth diode D4 is grounded.

The voltage-stabilizing circuit 222 may include a first electrolytic capacitor EC1, a fourth resistor R1, a fifth resistor R2 and a first capacitor C6, wherein a positive electrode end of the first electrolytic capacitor EC1 is connected to the first output end of the rectifier bridge 221, and a negative electrode end of the first electrolytic capacitor EC1 is grounded; one end of the fourth resistor R1 is connected to a positive electrode end of the first electrolytic capacitor EC1 and is provided with the third node J3, wherein the voltage-stabilizing circuit 222 outputs the voltage-stabilized power supply through the third node J3; one end of the fifth resistor R2 is connected to the other end of the fourth resistor R1, and the other end of the fifth resistor R2 is grounded; and the first capacitor C6 is connected in parallel to the fifth resistor R2.

Specifically, as shown in FIG. 3, the resonant receiving unit 210 induces an alternating electromagnetic field generated by the resonant transmitting unit 110 through the wireless receiving coil L1 and converts the alternating electromagnetic field induced by the wireless receiving coil L1 into an induced voltage signal through the first resonant capacitor C3 and the second resonant capacitor C5. Then, the induced voltage signal is rectified by the rectifier bridge 221 to generate an induced current, and then, the voltage-stabilizing circuit 222 processes the induced current through the above-mentioned circuit structure to output the voltage-stabilized power supply VCC. In addition, the processing processes of the rectifier bridge 221 and the voltage-stabilizing circuit 222 may be implemented by adopting the prior art, and the descriptions thereof are omitted herein.

In conclusion, according to the load sudden-change protection circuit for the electromagnetic induction type wireless power supply system, provided by the embodiment of the present invention, the overvoltage protection unit turns on the load when the voltage of the voltage-stabilized power supply is higher than the first preset voltage due to sudden turn-off of the load, and the under-voltage protection unit turns off the load when the voltage of the voltage-stabilized power supply is lower than the second preset voltage due to sudden turn-on of the load. Therefore, the problems of device damage in the circuit, system operation interruption and the like caused by the sudden change of the load may be effectively solved.

In addition, an embodiment of the present invention further provides an electromagnetic induction type wireless power supply system including the above-mentioned load sudden-change protection circuit, as shown in FIG. 2, and the descriptions thereof are omitted herein.

According to the electromagnetic induction type wireless power supply system provided by the embodiment of the present invention, by the adoption of the load sudden-change protection circuit for the above-mentioned electromagnetic induction type wireless power supply system, the problems of device damage in the circuit, system operation interruption and the like caused by the sudden change of the load may be effectively solved.

In addition, an embodiment of the present invention further provides a separated cooking appliance including the above-mentioned electromagnetic induction type wireless power supply system. For example, the separated cooking appliance may be a separated electric rice cooker or separated electric pressure cooker.

According to the separated cooking appliance provided by the embodiment of the present invention, by the adoption of the above-mentioned electromagnetic induction type wireless power supply system, the problems of device damage in the circuit, system operation interruption and the like caused by the sudden change of the load may be effectively solved.

In the description of the present invention, it should be understood that directional or positional relationships indicated by terms "center", "longitudinal", "transverse", "length", "width", "thickness", "upper", "lower", "front", "rear", "left", "right", "vertical", "horizontal", "top", "bottom", "inner", "outer", "clockwise", "anticlockwise", "axial", "radial", "circumferential" and the like are based on directional or positional relationships as shown in the accompanying drawing and are merely intended to facilitate describing the present invention and simplifying the description, rather than to indicate or imply that the indicated device or element has to be in a specific direction and be constructed and operated in the specific direction so as not to be understood as limitations to the present invention.

In addition, terms "first" and "second" are for descriptive purposes only, and cannot be understood as indicating or implying the relative importance or implicitly indicating the number of indicated technical features. Therefore, the features defined as "first" and "second" may explicitly or implicitly include one or more of the features. In the description of the present invention, the meaning of "a plurality of" is two or more, unless it may be specifically defined otherwise.

In the present invention, terms "arranged", "connected", "connection", "fixely" and the like should be understood in a broad sense unless otherwise specified and defined, for example, "connection" may be fixed connection or detachable connection or an integral whole, may be mechanical connection or electrical connection, may be direct connection or indirect connection through an intermediate medium, and may be internal connection of two elements or interaction between two elements. For those of ordinary skill in the art, the specific meanings of the above terms in the present invention may be understood according to specific situations.

In the present invention, the first feature located "on" or "under" the second feature may mean that the first feature is in direct contact with the second feature, or the first feature is in indirect contact with the second feature through an intermediate medium. Moreover, the first feature located "over" or "above" and "topside" the second feature may mean that the first feature is located right above or oblique above the second feature or only show that the horizontal height of the first feature is greater than that of the second feature. The first feature located "under", "below" and "underside" the second feature may mean that the first feature is located right below or oblique below the second feature or only show that the horizontal height of the first feature is less than that of the second feature.

In the present invention, descriptions with reference to terms "one embodiment", "some embodiments", "example", "specific example" or "some examples" and the like mean that specific features, structures, materials or characteristics described in combination with the embodiments or examples are included in at least one embodiment or example of the present invention. In the specification, the schematic statements for the above-mentioned terms are not required to be specific to the same embodiment or example. Moreover, the described specific features, structures, materials or characteristics may be combined in any one or more of the embodiments or examples in an appropriate way. In addition, the different embodiments or examples and the features thereof described in the specification may be incorporated or combined without mutual conflicts by the skilled in the art.

Although the embodiments of the present invention have been shown and described as above, it can be understood that the above-mentioned embodiments are exemplar and cannot be understood as limitations to the present invention, and the above-mentioned embodiments can be changed, altered, substituted and modified by those of ordinary skill in the art within the scope of the present invention.

What is claimed is:

1. A load sudden-change protection circuit, comprising:
an overvoltage protection component; and
an under-voltage protection component, wherein the load sudden-change protection circuit is configured to be connected between an electromagnetic induction type wireless power supply system and a load,
wherein the electromagnetic induction type wireless power supply system includes a wireless power supply end and a wireless receiving end, the wireless receiving end includes a resonant receiving component and a rectifying and voltage-stabilizing component connected to the resonant receiving component, the rectifying and voltage-stabilizing component processes electric energy received by the resonant receiving component to output a voltage-stabilized power supply Voltage Common Collector (VCC),
wherein the overvoltage protection component is connected to the voltage-stabilized power supply VCC and the load, and the overvoltage protection component is configured to turn on the load when a voltage of the voltage-stabilized power supply VCC is higher than a first preset voltage due to sudden turn-off of the load; and
wherein the under-voltage protection component is connected to the voltage-stabilized power supply VCC and the load, and the under-voltage protection component is configured to turn off the load when the voltage of the voltage-stabilized power supply VCC is lower than a second preset voltage due to sudden turn-on of the load.

2. The load sudden-change protection circuit of claim 1, wherein the overvoltage protection component includes:
a first voltage-stabilizing zener diode, a cathode of the first voltage-stabilizing zener diode being connected to positive electrode ends of the voltage-stabilized power supply VCC and the load;
a first resistor, a first end of the first resistor being connected to an anode of the first voltage-stabilizing zener diode; and
a first BJT, a base electrode of the first BJT being connected to a second end of the first resistor, an emitter electrode of the first BJT being grounded, and a collector electrode of the first triode BJT being connected to a negative electrode end of the load.

3. The load sudden-change protection circuit of claim 2, wherein the under-voltage protection component includes:
a second voltage-stabilizing zener diode, a cathode of the second voltage-stabilizing zener diode being connected to positive electrode ends of the voltage-stabilized power supply VCC and the load;
a second resistor, a first end of the second resistor being connected to an anode of the second voltage-stabilizing zener diode;
a second BJT, a base electrode of the second BJT being connected to a second end of the second resistor, and an emitter electrode of the second BJT being grounded; and
a third BJT, an emitter electrode of the third BJT being connected to a collector electrode of the second BJT, a collector electrode of the third BJT being connected to a negative electrode end of the load, and a base electrode B of the third BJT being connected to a main control chip of the wireless receiving end through a third resistor, wherein the third BJT is turned on or off under the control of the main control chip of the wireless receiving end.

4. The load sudden-change protection circuit of claim 1, wherein the resonant receiving component includes:
a wireless receiving coil, the wireless receiving coil being matched with a wireless transmitting coil of the wireless power supply end, and the wireless receiving coil being electromagnetically coupled with the wireless transmitting coil so as to ensure that electric energy is transmitted between the wireless power supply end and the wireless receiving end; and
a first resonant capacitor and a second resonant capacitor, a first end of the first resonant capacitor being connected to a first end of the wireless receiving coil, a second end of the first resonant capacitor being connected to a first end of the second resonant capacitor and being provided with a first node, and a second end of the second resonant capacitor being connected to a second end of the wireless receiving coil and being provided with a second node.

5. The load sudden-change protection circuit of claim 4, wherein the rectifying and voltage-stabilizing component includes a rectifier bridge and a voltage-stabilizing circuit, a first input end of the rectifier bridge is connected to the first node, a second input end of the rectifier bridge is connected to the second node, a first output end of the rectifier bridge is connected to the voltage-stabilizing circuit, and a second output end of the rectifier bridge is grounded.

6. The load sudden-change protection circuit of claim 5, wherein the voltage-stabilizing circuit includes:

a first electrolytic capacitor, a positive electrode end of the first electrolytic capacitor being connected to the first output end of the rectifier bridge, and a negative electrode end of the first electrolytic capacitor being grounded;
a fourth resistor, one end of the fourth resistor being connected to a positive electrode end of the first electrolytic capacitor and being provided with a third node, wherein the voltage-stabilizing circuit outputs the voltage-stabilized power supply VCC through the third node;
a fifth resistor, a first end of the fifth resistor being connected to a second end of the fourth resistor, and a second end of the fifth resistor being grounded; and
a first capacitor, the first capacitor being connected in parallel to the fifth resistor.

7. The load sudden-change protection circuit of claim 4, wherein the wireless receiving end includes a communication demodulation circuit and a communication modulation circuit, the communication demodulation circuit is connected between the main control chip and a second end of the wireless receiving coil, the communication modulation circuit is connected between the main control chip and a first end of the wireless receiving coil, the main control chip receives communication information transmitted by the wireless power supply end through the wireless receiving coil and the communication demodulation circuit and transmits the communication information to the wireless power supply end through the communication modulation circuit and the wireless receiving coil.

8. An electromagnetic induction type wireless power supply system, comprising:
a wireless power supply end;
a wireless receiving end; and
a load sudden-change protection circuit, including an overvoltage protection component and an under-voltage protection component, wherein:
the wireless receiving end includes a resonant receiving component and a rectifying and voltage-stabilizing component connected to the resonant receiving component, the rectifying and voltage-stabilizing component processes electric energy received by the resonant receiving component to output a voltage-stabilized power supply Voltage Common Collector (VCC),
the overvoltage protection component is connected to the voltage-stabilized power supply VCC and a load, and the overvoltage protection component is configured to turn on the load when a voltage of the voltage-stabilized power supply VCC is higher than a first preset voltage due to sudden turn-off of the load, and
the under-voltage protection component is connected to the voltage-stabilized power supply VCC and the load, and the under-voltage protection component is configured to turn off the load when the voltage of the voltage-stabilized power supply VCC is lower than a second preset voltage due to sudden turn-on of the load.

9. The electromagnetic induction type wireless power supply system of claim 8, wherein the overvoltage protection component includes:
a first voltage-stabilizing zener diode, a cathode of the first voltage-stabilizing zener diode being connected to positive electrode ends of the voltage-stabilized power supply VCC and the load;

a first resistor, a first end of the first resistor being connected to an anode of the first voltage-stabilizing zener diode; and a first BJT, a base electrode of the first BJT being connected to a second end of the first resistor, an emitter electrode of the first BJT being grounded, and a collector electrode of the first BJT being connected to a negative electrode end of the load.

10. The electromagnetic induction type wireless power supply system of claim 9, wherein the under-voltage protection component includes:

a second voltage-stabilizing zener diode, a cathode of the second voltage-stabilizing zener diode being connected to positive electrode ends of the voltage-stabilized power supply VCC and the load;

a second resistor, a first end of the second resistor being connected to an anode of the second voltage-stabilizing zener diode;

a second BJT, a base electrode of the second BJT being connected to a second end of the second resistor, and an emitter electrode of the second triode BJT being grounded; and a third BJT, an emitter electrode of the third BJT being connected to a collector electrode of the second BJT, a collector electrode of the third BJT being connected to a negative electrode end of the load, and a base electrode B of the third BJT being connected to a main control chip of the wireless receiving end through a third resistor, wherein the third BJT is turned on or off under the control of the main control chip of the wireless receiving end.

11. The electromagnetic induction type wireless power supply system of claim 8, wherein the resonant receiving component includes:

a wireless receiving coil, the wireless receiving coil being matched with a wireless transmitting coil of the wireless power supply end, and the wireless receiving coil being electromagnetically coupled with the wireless transmitting coil so as to ensure that electric energy is transmitted between the wireless power supply end and the wireless receiving end; and a first resonant capacitor and a second resonant capacitor, a first end of the first resonant capacitor being connected to a first end of the wireless receiving coil, a second end of the first resonant capacitor being connected to a first end of the second resonant capacitor and being provided with a first node, and a second end of the second resonant capacitor being connected to a second end of the wireless receiving coil and being provided with a second node.

12. The electromagnetic induction type wireless power supply system of claim 11, wherein the rectifying and voltage-stabilizing component includes a rectifier bridge and a voltage-stabilizing circuit, a first input end of the rectifier bridge is connected to the first node, a second input end of the rectifier bridge is connected to the second node, a first output end of the rectifier bridge is connected to the voltage-stabilizing circuit, and a second output end of the rectifier bridge is grounded.

13. The electromagnetic induction type wireless power supply system of claim 12, wherein the voltage-stabilizing circuit includes:

a first electrolytic capacitor, a positive electrode end of the first electrolytic capacitor being connected to the first output end of the rectifier bridge, and a negative electrode end of the first electrolytic capacitor being grounded;

a fourth resistor, one end of the fourth resistor being connected to a positive electrode end of the first electrolytic capacitor and being provided with a third node, wherein the voltage-stabilizing circuit outputs the voltage-stabilized power supply VCC through the third node;

a fifth resistor, a first end of the fifth resistor being connected to a second end of the fourth resistor, and a second end of the fifth resistor being grounded; and a first capacitor, the first capacitor being connected in parallel to the fifth resistor.

14. The electromagnetic induction type wireless power supply system of claim 11, wherein the wireless receiving end includes a communication demodulation circuit and a communication modulation circuit, the communication demodulation circuit is connected between the main control chip and a second end of the wireless receiving coil, the communication modulation circuit is connected between the main control chip and a first end of the wireless receiving coil, the main control chip receives communication information transmitted by the wireless power supply end through the wireless receiving coil and the communication demodulation circuit and transmits the communication information to the wireless power supply end through the communication modulation circuit and the wireless receiving coil.

* * * * *